(12) United States Patent
Jiang et al.

(10) Patent No.: US 11,296,532 B2
(45) Date of Patent: Apr. 5, 2022

(54) DUAL-LOOP BATTERY CHARGING SYSTEM

(71) Applicant: NXP B.V., Eindhoven (NL)

(72) Inventors: Yan Jiang, Shanghai (CN); Xuechu Li, Shanghai (CN); Jian Qing, Shanghai (CN)

(73) Assignee: NXP B.V., Eindhoven (NL)

( * ) Notice: Subject to any disclaimer, the term of this patent is extended or adjusted under 35 U.S.C. 154(b) by 111 days.

(21) Appl. No.: 16/243,009

(22) Filed: Jan. 8, 2019

(65) Prior Publication Data

US 2020/0203979 A1 Jun. 25, 2020

(30) Foreign Application Priority Data

Dec. 21, 2018 (CN) .......................... 201811568019.0

(51) Int. Cl.
*H02J 7/00* (2006.01)
*H04B 5/00* (2006.01)
*H02J 50/80* (2016.01)
*H02J 7/02* (2016.01)

(52) U.S. Cl.
CPC ............ *H02J 7/0072* (2013.01); *H02J 7/025* (2013.01); *H02J 50/80* (2016.02); *H04B 5/0037* (2013.01)

(58) Field of Classification Search
CPC . Y02E 60/12; H02J 7/025; H02J 5/005; H02J 17/00; H02J 7/0072; H02J 50/80; H02J 7/007; H02J 7/0071; H02J 7/00711; H02J 7/00712; H02J 7/00714; H02J 7/00716; H02J 7/00718; H02J 7/007182; H02J 7/007184; H02J 7/007186; H02J 7/007188; H02J 7/00719; H02J 7/007192; H02J 7/007194; H01F 38/14; Y02T 90/122; B60L 11/182; H04B 5/0037
USPC .......................................... 320/108; 307/104
See application file for complete search history.

(56) References Cited

U.S. PATENT DOCUMENTS

| 5,200,689 A | 4/1993 | Interiano et al. |
| 5,402,055 A | 3/1995 | Nguyen |
| 5,510,693 A | 4/1996 | Theobald |
| 2006/0267552 A1* | 11/2006 | Baer ....................... H02J 7/342 320/128 |
| 2008/0297104 A1 | 12/2008 | Rao et al. |
| 2009/0195213 A1* | 8/2009 | Li ......................... H02J 7/0016 320/136 |

(Continued)

*Primary Examiner* — Richard Isla
*Assistant Examiner* — Mohammed J Sharief (57) ABSTRACT

A wireless battery charging system includes a trickle power device (e.g., FET) that generates a trickle charging current for charging a battery and a trickle charging regulator that controls the trickle power device. A fast charging device generates a fast charging current for charging the battery, where the fast charging current is greater than the trickle charging current. A fast charging regulator controls the fast charging device. A digital control module generates a trickle charging codeword to control the trickle charging regulator and a fast charging codeword to control the fast charging regulator. Each charging regulator has a programmable current mirror that generates a mirrored current signal based on a codeword from the digital control module. The digital control module instructs the charging regulators to control the power devices to operate in a trickle charging mode, a fast charging mode, and transitions between those modes.

21 Claims, 8 Drawing Sheets

(56) References Cited

U.S. PATENT DOCUMENTS

| | | | |
|---|---|---|---|
| 2009/0309547 A1* | 12/2009 | Nakatsuji | H01M 10/441 |
| | | | 320/134 |
| 2013/0033235 A1* | 2/2013 | Fukaya | H02J 7/025 |
| | | | 320/162 |
| 2013/0140906 A1* | 6/2013 | Tanabe | H02J 7/025 |
| | | | 307/104 |
| 2013/0162196 A1 | 6/2013 | Li | |
| 2013/0314054 A1* | 11/2013 | Bergqvist | H02J 7/0088 |
| | | | 320/162 |
| 2014/0139176 A1* | 5/2014 | Ji | H02J 7/007184 |
| | | | 320/107 |
| 2014/0145675 A1* | 5/2014 | Shimizu | H02J 7/025 |
| | | | 320/108 |
| 2014/0167681 A1* | 6/2014 | Tu | H02J 7/007182 |
| | | | 320/107 |
| 2014/0266018 A1 | 9/2014 | Carobolaute | |
| 2015/0180254 A1* | 6/2015 | Zhao | H02J 7/007182 |
| | | | 320/107 |
| 2017/0025882 A1* | 1/2017 | Chien | H02J 7/025 |
| 2018/0102652 A1 | 4/2018 | Desrosiers et al. | |
| 2019/0109484 A1* | 4/2019 | Chen | G06F 13/42 |
| 2019/0215032 A1* | 7/2019 | Tanabe | G06F 21/44 |

* cited by examiner

DUAL-LOOP BATTERY CHARGING SYSTEM

BACKGROUND

The present invention relates generally to battery charging systems and, more particularly, to wireless battery charging systems.

Figure 1:
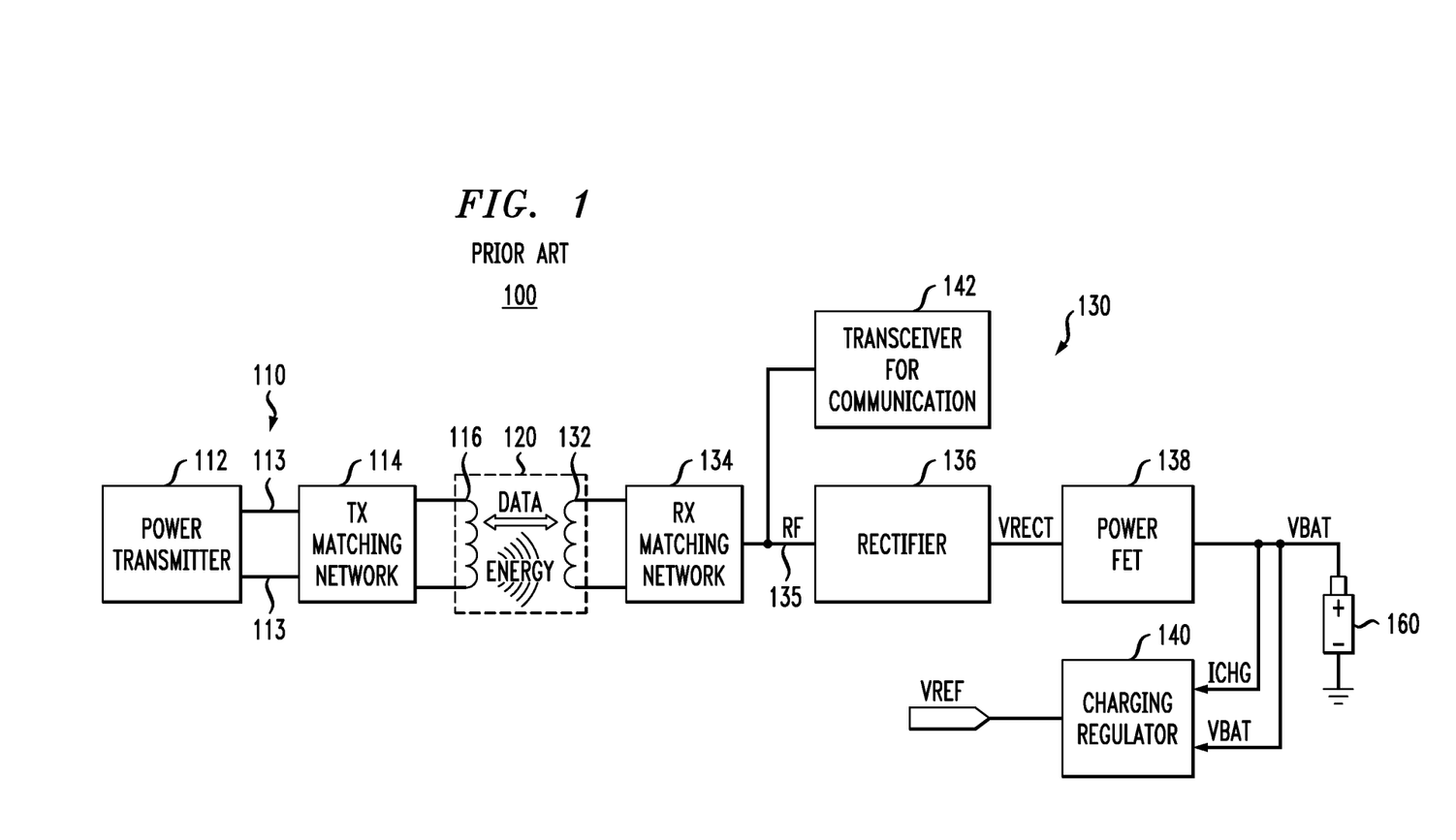
FIG. 1 is a simplified block diagram of a conventional wireless battery charging system.

FIG. 1 is a simplified block diagram of a conventional wireless battery charging system 100 for charging a battery 160. The wireless battery charging system 100 has a power transmitter (TX) 110 and a power receiver (RX) 130. The TX 110 includes transmitter 112, TX matching network 114, and TX inductor coil 116, while the RX 130 includes RX inductor coil 132, RX matching network 134, rectifier (i.e., AC-to-DC converter) 136, power FET (field-effect transistor) 138, charging regulator 140, and communications transceiver 142. The matching networks 114 and 134 are designed to ensure that the output impedance of the TX 110 matches the input impedance of the RX 130. The TX and RX inductor coils 116 and 132 form an inductive interface 120 for wirelessly (i.e., magnetically) transferring power from the TX 110 to the RX 130 and communications signals between the TX and RX 110 and 130.

The power transmitter 112 applies an AC power signal 113 to the TX inductor coil 116 via the TX matching network 114. The AC power signal in the TX inductor coil 116 induces an AC power signal in the RX inductor coil 132, which is applied via the RX matching network 134 as AC power signal 135 to the rectifier 136. The rectifier 136 rectifies the AC power signal 135 to produce a DC power signal VRECT that is applied to the power FET 138, which is controlled by the charging regulator 140.

The communication transceiver 142 transmits and receives outgoing and incoming communication signals via the inductive interface 120 to and from the TX 110.

The power FET 138 provides a charging current ICHG to charge the battery 160 to a desired regulated voltage level VREG. The charging regulator 140 turns on and off the power FET 138 based on a portion of the charging current ICHG sampled at tap 144 and a measure of the battery voltage VBAT. In addition, the charging regulator 140 monitors VRECT, VBAT, and ICHG and instructs the communication transceiver 142 to transmit communication signals to instruct the TX 110 to increase or decrease the power transfer level as needed to control the charging of the battery 160.

Figure 2:
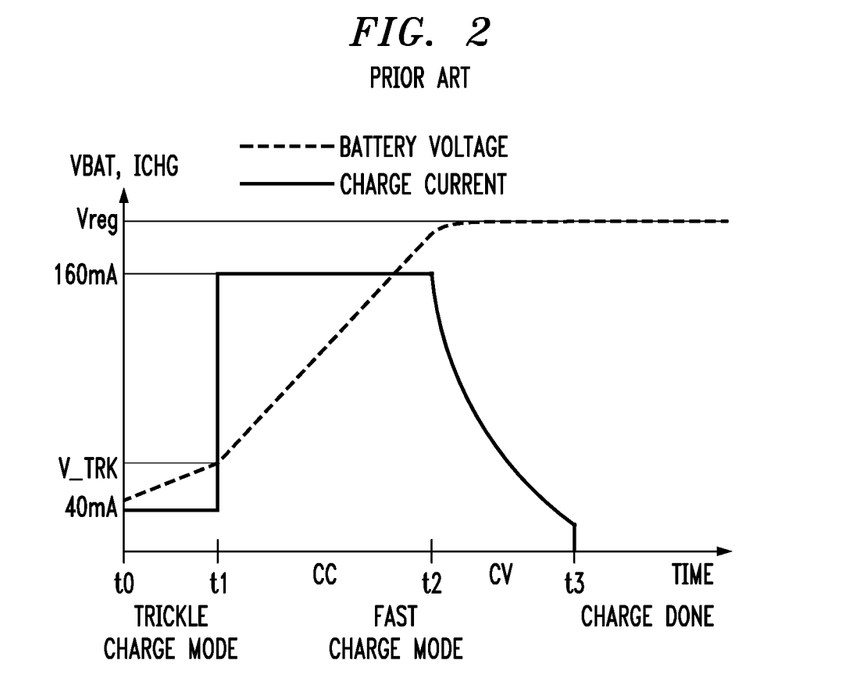
FIG. 2 is a timing diagram showing the charging current ICHG and the battery voltage VBAT in the system of FIG. 1 as a function of time for a particular battery charging profile.

FIG. 2 is a timing diagram showing the charging current ICHG and the battery voltage VBAT as a function of time for a particular battery charging profile. As known in the art, batteries are charged using two different levels of charging current: a relatively low trickle charging current (e.g., 40 mA) and a relatively high fast charging current (e.g., 160 mA), where, for safety reasons, the trickle charging current is applied when the battery voltage is below a specified threshold voltage V_TRK, and the fast charging current is applied when the battery voltage is above V_TRK.

At time t0, the battery voltage VBAT is below the threshold voltage V_TRK. As such, the charging regulator 140 controls the power FET 138 to produce a charging current ICHG equal to the trickle charging current. From time t0 to time t1, the trickle charging current is applied to the battery 160 as the battery voltage VBAT rises to V_TRK.

At time t1, when VBAT exceeds V_TRK, the charging regulator 140 controls the power FET 138 to produce a charging current ICHG equal to the fast charging current. From time t1 to time t2, the fast charging current is applied to the battery 160 as the battery voltage VBAT rises all the way to its regulated voltage VREG.

At time t2, when VBAT has reached VREG, the charging regulator 140 controls the power FET 138 to gradually reduce the charging current ICHG down to a level below the trickle charging current at time t3. At time t3, with the battery 160 fully charged and the charging current ICHG at a sufficiently low level, the charging regulator 140 turns off the power FET 138.

Note that, as the charging regulator 140 controls the power FET 138 to increase and decrease the charging current (i.e., the analog control loop within the RX 130), the rectified DC voltage level VRECT might also change. The transceiver 130 monitors VRECT and, if appropriate, signals the TX 110 to increase or decrease the power transfer level (i.e., the system-level digital control loop within the wireless battery charging system 100) as needed to ensure that the analog control loop is capable of keeping the charging current ICHG at the desired level.

Figure 3:
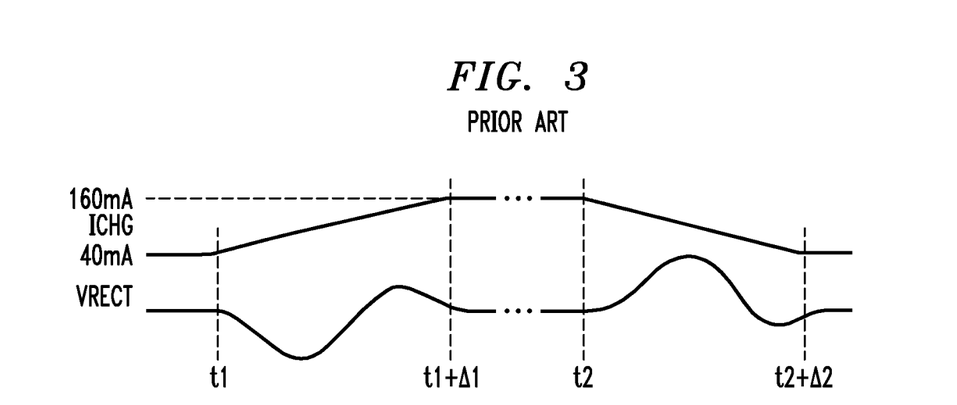
FIG. 3 is a timing diagram of two charging current transitions of FIG. 2.

FIG. 3 is a timing diagram of two of the charging current transitions of FIG. 2. In particular, FIG. 3 shows the voltage ripples that occur in the rectified DC voltage VRECT when the charging current ICHG rapidly increases from the trickle charging current to the fast charging current immediately following time t1 and again when the charging current ICHG rapidly decreases from the fast charging current to the trickle charging current immediately following time t2. Since the system-level control loop in which the RX 130 instructs the TX 110 to increase or decrease the power transfer level is relatively slow, the system-level control loop is not able to prevent these voltage ripples in a timely manner. Such ripples in VRECT could have significant adverse impact on the operation of the charging system 100.

Furthermore, since the power transfer path shares the same inductive interface 120 as the communication path, rapid changes in the power transfer level can interfere with the ability of the communication path to successfully convey wireless messages between the TX 110 and the RX 130. Accordingly, it would be advantageous to be able to transfer power without interfering with communications.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

According to embodiments of the present invention, in a wireless battery charging system having a power transmitter (TX) and a power receiver (RX), the RX has two different charging regulators that control two different power FETs. A trickle charging regulator controls a trickle power FET during a trickle charging mode and a fast charging regulator controls a fast power FET during a fast charging mode, where the trickle power FET is operated at a finer current resolution, but over a smaller range of current levels than the fast power FET. By providing two different charging regulators that control two different power FETs at different current resolutions and ranges, the wireless battery charging system is able to operate with less voltage ripple in the rectified DC voltage signal VRECT and less interference with the wireless communication path between the TX and RX.

One embodiment of the invention is a battery charging system for generating a battery charging current for charging a battery. The system comprises a trickle power device that generates a trickle charging current for charging the battery, a trickle charging regulator that controls the trickle power device, and a fast charging device that generates a fast charging current for charging the battery, where the fast charging current is greater than the trickle charging current.

A fast charging regulator controls the fast charging device. A digital control module generates a trickle charging codeword for controlling the trickle charging regulator and a fast charging codeword for controlling the fast charging regulator.

Figure 4:
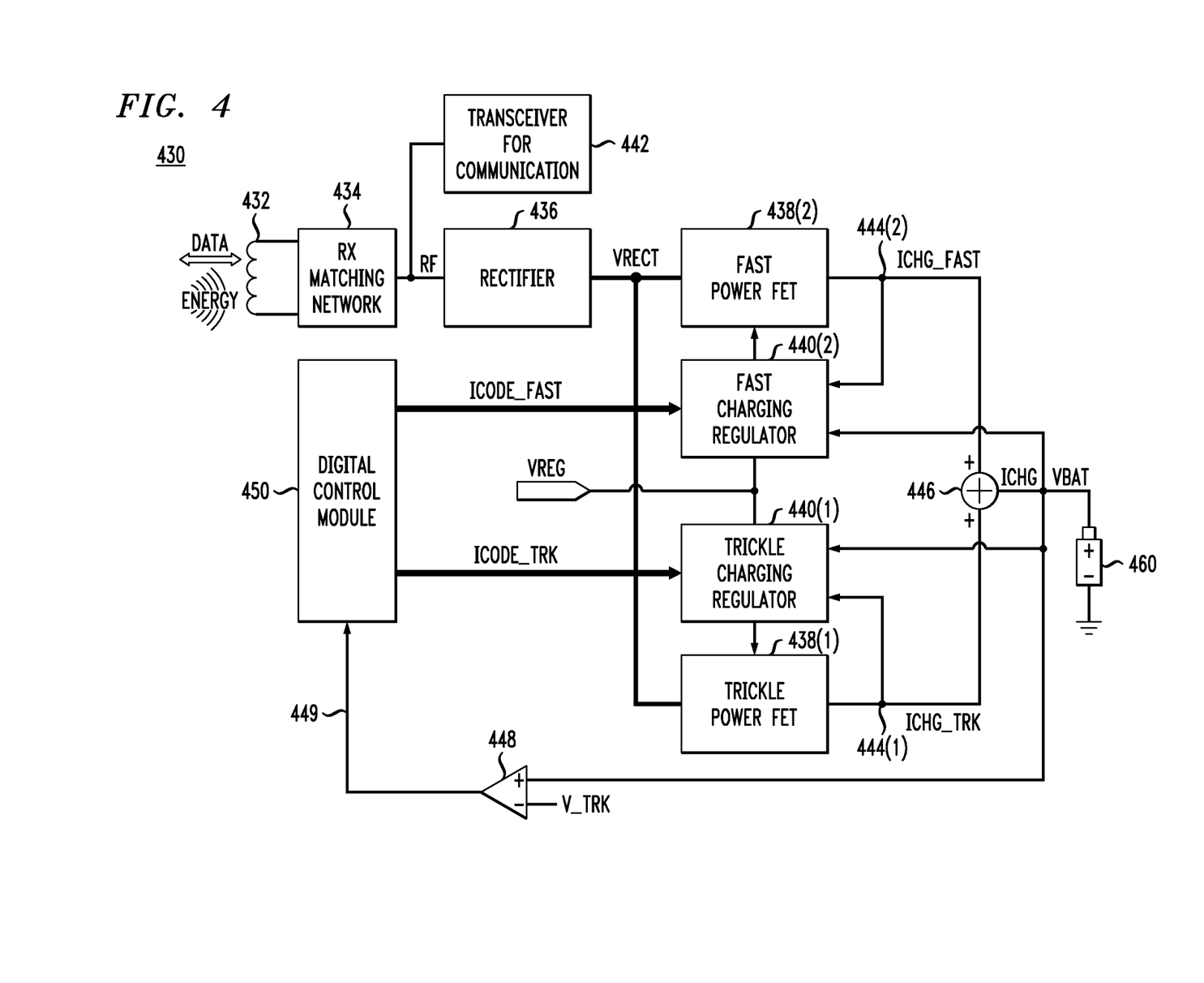
FIG. 4 is a schematic block diagram of a Receiver (RX) that can be used in a wireless battery charging system according to one embodiment of the invention.

Referring now to FIG. 4, a block diagram of a RX 430 according to one embodiment of the invention that can be used in a wireless battery charging system analogous to the wireless battery charging system 100 of FIG. 1 in place of the RX 130 is shown. Like the RX 130, the RX 430 includes RX inductor coil 432, RX matching network 434, rectifier 436, and communication transceiver 442, each of which performs analogous functions as their corresponding elements in the RX 130 of FIG. 1, and generates a charging current ICHG used to charge a battery 460.

Instead of a single control loop that controls the charging of a battery, as in the RX 130 of FIG. 1, the RX 430 has two control loops with two different charging regulators controlling two different power FETs, namely a trickle charging regulator 440(1) that controls a trickle power FET 438(1) and a fast charging regulator 440(2) that controls a fast power FET 438(2), where the trickle power FET 438(1) is operated at a finer current resolution, but over a smaller range of current levels than the fast power FET 438(2). For example, in one embodiment, the trickle power FET 438(1) is operated at a current resolution of 1 mA over a current range between 0 mA and 40 mA, while the fast power FET 438(2) is operated at a current resolution of 5 mA over a current range between 0 mA and 160 mA. Those skilled in the art will understand that other suitable current resolutions and/or other suitable current ranges are possible.

During the trickle charging mode, all the charging current ICHG is provided by the trickle power FET 438(1), and, during the fast charging mode, all of the charging current ICHG is provided by the fast power FET 438(2). During transitions between the trickle and fast charging modes, the charging current ICHG may be provided by both power FETs 438(1) and 438(2).

A current summer 446 generates the charging current ICHG, which is a sum of the currents ICHG_TRK and ICHG_FAST generated by the two power FETs 438(1) and 438(2). A comparator 448 generates a control signal 449 for the digital control module 450 based on a comparison of the battery voltage VBAT to a threshold voltage V_TRK. A digital control module 450 receives the control signal 449 and provides respective digital codewords ICODE_TRK and ICODE_FAST to the trickle and fast charging regulators 440(1) and 440(2). In some implementations, the digital control module 450 is a programmable module that can be programmed and re-programmed to perform different suitable sequences. In other implementations, the digital control module 450 is hard-coded to perform only a single sequence. The usage of the codewords by the regulators 440(1) and 440(2) is shown in more detail with respect to FIG. 6, and the usage of the codewords is discussed in more detail with respect to FIGS. 8-10, such that one of skill in the art will more readily understand a suitable implementation for the control module 450.

Figure 5:
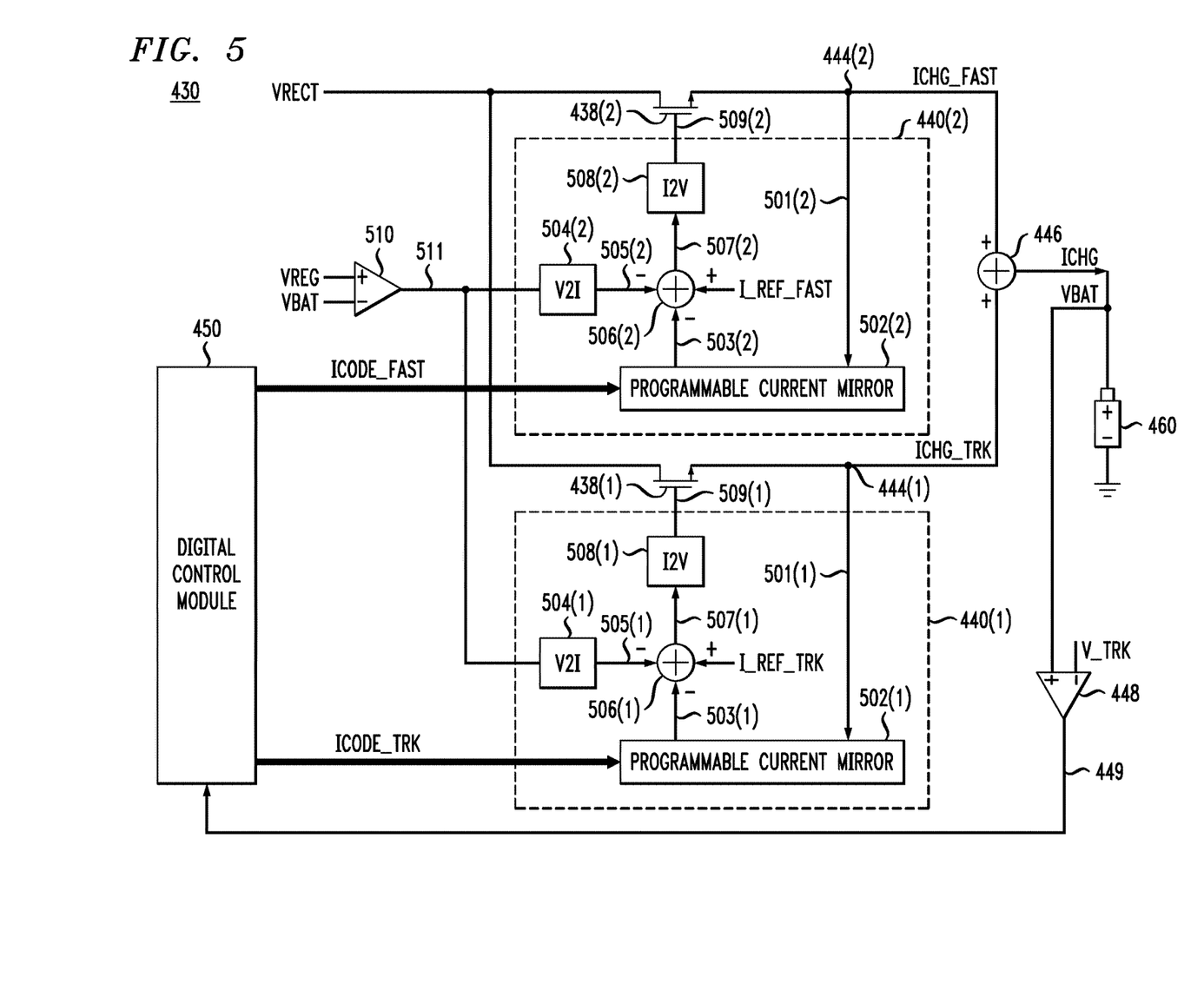
FIG. 5 is a schematic block diagram of a portion of the RX of FIG. 4 showing implementation details of the trickle and fast charging regulators.

FIG. 5 is a block diagram of a portion of the RX 430 of FIG. 4 showing implementation details of the trickle charging regulator 440(1) and the trickle charging FET 438(1). It will be understood by those of skill in the art that the fast charging regulator 440(2) and the fast charging FET 438(2) have the same design. Thus, only the trickle charging regulator 440(1) is described herein. In particular, the charging regulator 440(1) has a programmable current mirror 502(1), a voltage-to-current (V2I) converter 504(1), a current summer 506(1), and a high-input-impedance current-to-voltage (I2V) converter 508(1). In addition, the RX 430 has an amplifier 510 that generates an amplifier output signal 511 that is provided to the V2I 504(1) (and the V2I 504(2)). The amplifier output signal 511 is based on a difference between the present battery voltage VBAT and the battery's regulator voltage VREG. When VBAT is less than VREG, the amplifier 510 generates a positive-voltage amplifier output signal 511 that is proportional to (VREG-VBAT). Otherwise, the amplifier output signal 511 is a zero voltage signal.

Referring first to the trickle charging regulator 440(1), which controls the trickle charging current ICHG_TRK generated by the trickle power FET 438(1), the programmable current mirror 502(1) generates a mirrored current sink signal 503(1) based on (i) a portion 501(1) of the trickle charging current ICHG_TRK tapped at node 444(1) and (ii) the digital trickle-charging codeword ICODE_TRK received from the digital control module 450. Similarly, for the fast charging regulator 440(2), which controls the fast charging current ICHG_FAST generated by the fast power FET 438(2), the programmable current mirror 502(2) generates a mirrored current signal 503(2) based on (i) a portion 501(2) of the fast charging current ICHG_FAST tapped at node 444(2) and (ii) the digital fast-charging codeword ICODE_FAST received from the digital control module 450.

Figure 6:
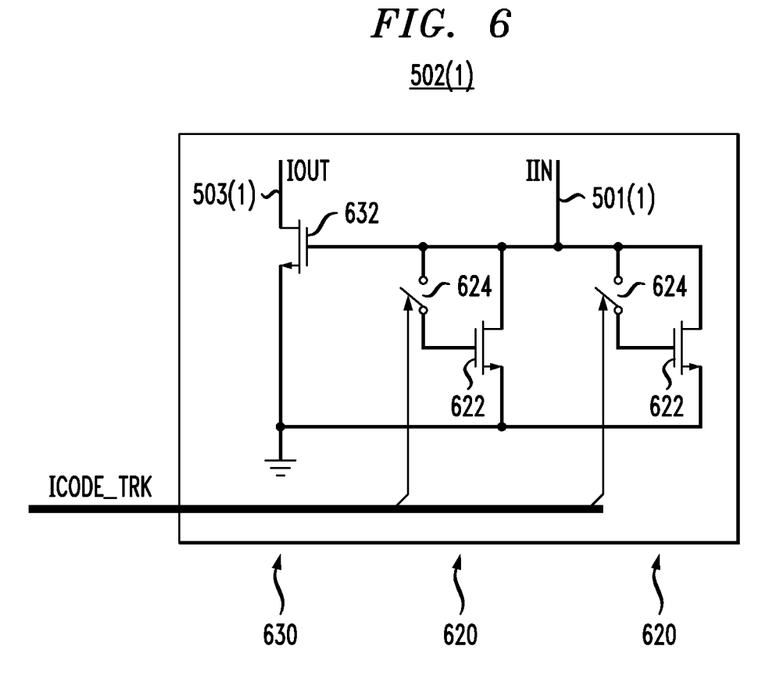
FIG. 6 is a simplified schematic circuit diagram of a programmable current mirror EB(1) of FIG. 5.

FIG. 6 is a simplified schematic diagram of the programmable current mirror 502(1) of FIG. 5. As shown in FIG. 6, the programmable current mirror 502(1) has a number of parallel connected current legs 620, each comprising a FET 622 and a switch 624. In addition, the programmable current mirror 502(1) has a mirrored, output current leg 630 comprising FET 632. Each switch 624 is controlled by a different corresponding bit of the digital trickle-charging codeword ICODE_TRK. When the corresponding bit value is 1, then the switch 624 is closed and the corresponding input current leg 620 is enabled; otherwise, the switch 624 is open and the corresponding input current leg 620 is disabled. Note that ICODE_TRK may be a thermometer-type digital codeword, where the value of the codeword is equal to the number of bits set to 1.

The current signal 501(1) tapped at the node 444(1) of FIG. 5 is applied to an input terminal indicated as IIN and the mirrored current sink signal 503(1) appears at an output node IOUT, where the mirrored current sink signal 503(1) is equal to N times the tapped current signal 501(1), where N is the number of enabled input current legs 620 (i.e., the number of bits in ICODE_TRK set to 1).

Referring again to FIG. 5, the mirrored current sink signal 503(1) generated by the programmable current mirror 502 (1) is applied to the current summer 506(1), which also receives an internally generated, constant, trickle-charging reference source current I_REF_TRK and an amplifier current sink signal 505(1) generated by V2I converter 504(1) based on the amplifier output signal 511 generated by the amplifier 510. The current summer 506(1) generates a net current signal 507(1) based on the two current sink signals 503(1) and 505(1) subtracted from the trickle-charging reference source current I_REF_TRK.

The I2V converter 508(1) converts the net current signal 507(1) into a gate control voltage 509(1) that is applied to the gate of the power FET 438(1). The I2V converter 508(1) has a high input impedance, so the net current signal 507(1) is fixed. Larger values of ICODE_TRK will result in larger levels of the gate control voltage 509(1) being applied to the gate of the power FET 438(1), resulting in larger levels of the trickle-charging current ICHG_TRK. Over a certain voltage range, the magnitude of the gate control voltage 509(1) directly affects the magnitude of the trickle charging current ICHG_TRK generated by the trickle power FET 438(1).

Figure 7:
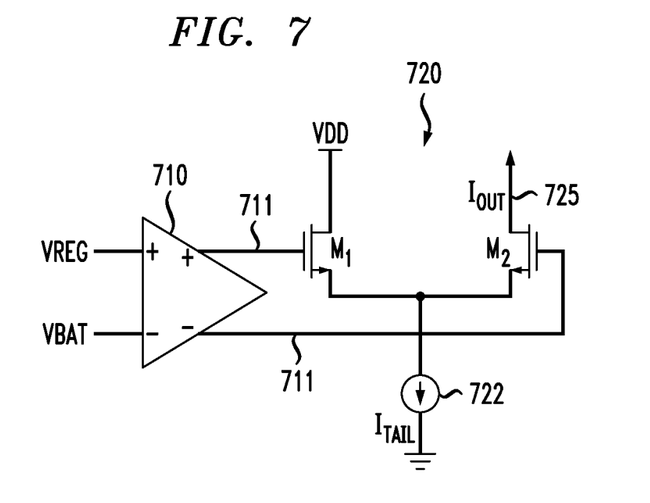
FIG. 7 is a schematic circuit diagram of (i) an error amplifier that can be used to implement the error amplifier of FIG. 5 and (ii) a V2I converter that can be used to implement each of the V2I converters of FIG. 5.

FIG. 7 is a schematic circuit diagram of an error amplifier 710 that can be used to implement the error amplifier 510 of FIG. 5 and a V2I converter 720 that can be used to implement each of the V2I converters 504(1) and 504(2) of FIG. 5, where an amplifier output signal 711 is analogous to the amplifier output signal 511 of FIG. 5 and an amplifier current sink signal 725 is analogous to the amplifier current sink signals 505(1) and 505(2) of FIG. 5. The V2I converter 720 includes two transistors M1 and M2 having source terminals connected to each other and to a current sink 722.

When VREG is much greater than VBAT, such as in the trickle charging mode, the error amplifier 710 will be saturated, the transistor M1 will be fully on, the transistor M2 will be fully off, and the amplifier current sink signal 725 will be zero. In that case, the trickle charging current ICHG_TRK of FIG. 5 will be a function of only the trickle charging codeword ICODE_TRK.

When VREG=VBAT, the transistors M1 and M2 will be equally turned on, and the amplifier current sink signal 725 will be half of the tail current $I_{TAIL}$ from the current sink 722. In typical operations, the RX 430 will switch from the trickle charging mode to the fast charging mode well before VBAT reaches VREG. In theory, however, the battery 460 can be completely charged in the trickle charging mode. In any case, as VBAT approaches VREG in either the trickle or fast charging modes, the magnitude of the amplifier current sink signal 505(1) will increase, which will increase the magnitude of the mirrored current sink signal 503(1), thereby lowering the gate control voltage 509(1) and decreasing the trickle charging current ICHG_TRK, independent of the codeword ICODE_TRK.

The charging regulator 440(2) is analogous to the charging regulator 440(1) with analogous components performing analogous functions. Note that, for the charging regulator 440(2), the current signal 501(2) is tapped from the fast charging current signal ICHG_FAST generated by the fast power FET 438(2), the programmable current mirror 502(2) receives a fast charging-current codeword ICODE_FAST, and the current summer 506(2) receives an internally generated, constant, fast-charging reference source current I_REF_FAST. Furthermore, the architecture of the programmable current mirror 502(2) is analogous to the architecture of the programmable current mirror 502(1) shown in FIG. 6, where the input current is the tapped current signal 501(2) and the output current is the mirrored current sink signal 503(2). Otherwise, the operations of the fast charging regulator 440(2) to control the fast power FET 438(2) are analogous to the operations of the trickle charging regulator 440(1) to control the trickle power FET 438(1).

Figure 8:
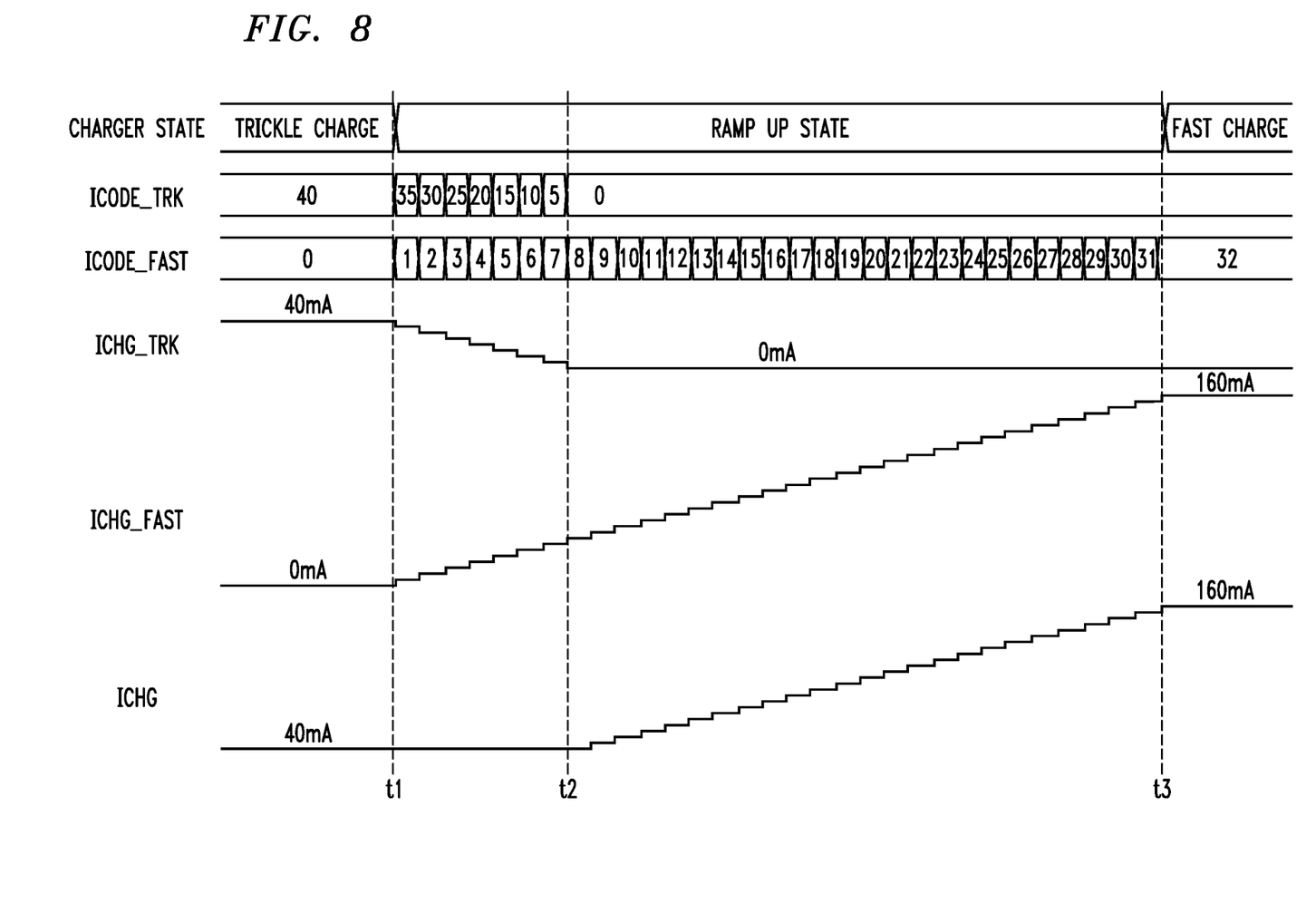
FIG. 8 is a timing diagram of example operations of the RX of FIG. 5 during a transition from the trickle charging mode to the fast charging mode.

FIG. 8 is a timing diagram of example operations of the RX 430 during a transition from (i) the trickle charging mode in which only the trickle power FET 438(1) contributes current to the charging current ICHG to (ii) the fast charging mode in which only the fast power FET 438(2) contributes current to the charging current ICHG. In this particular example, the trickle charging current ICHG_TRK is 40 mA, the fast charging current ICHG_FAST is 160 mA, each bit in ICODE_TRK is equivalent to 1 mA, and each bit in ICODE_FAST is equivalent to 5 mA. Other implementations may have different current levels for one or both of the charging currents and/or different current resolutions for one or both of the codewords.

As represented in FIG. 8, before time t1, the RX 430 is in the trickle charging mode, where ICODE_TRK has a decimal value of 40, the trickle power FET 438(1) generates a trickle charging current ICHG_TRK of 40 mA, ICODE_FAST has a decimal value of 0, the fast power FET 438(2) generates a fast charging current ICHG_FAST of 0 mA, and the charging current ICHG is the sum of ICHG_TRK and ICHG_FAST or 40 mA.

From time t1 to time t3, the RX 430 transitions from the trickle charging mode to the fast charging mode in two different phases: a first, constant current phase from time t1 to time t2 and a second, current ramp-up phase from time t2 to time t3.

In particular, during the constant current phase from time t1 to time t2, ICODE_TRK is stepped down from 40 to 0 in increments of 5, while ICODE_FAST is stepped up from 0 to 8 in increments of 1. Since each codeword bit in ICODE_FAST represents five times as much current as each codeword bit in ICODE_TRK, during this first phase, the charging current ICHG remains at 40 mA.

During the current ramp-up phase from time t2 to time t3, with ICODE_TRK at 0, ICODE_FAST is stepped up from 8 to 32 in increments of 1, resulting in the charging current ramping up from 40 mA to 160 mA.

After time t3, the RX 430 is operated in the fast charging mode, where ICODE_TRK is 0, ICHG_TRK is 0 mA, ICODE_FAST is 32, ICHG_FAST is 160 mA, and the charging current ICHG is 160 mA.

Figure 9:
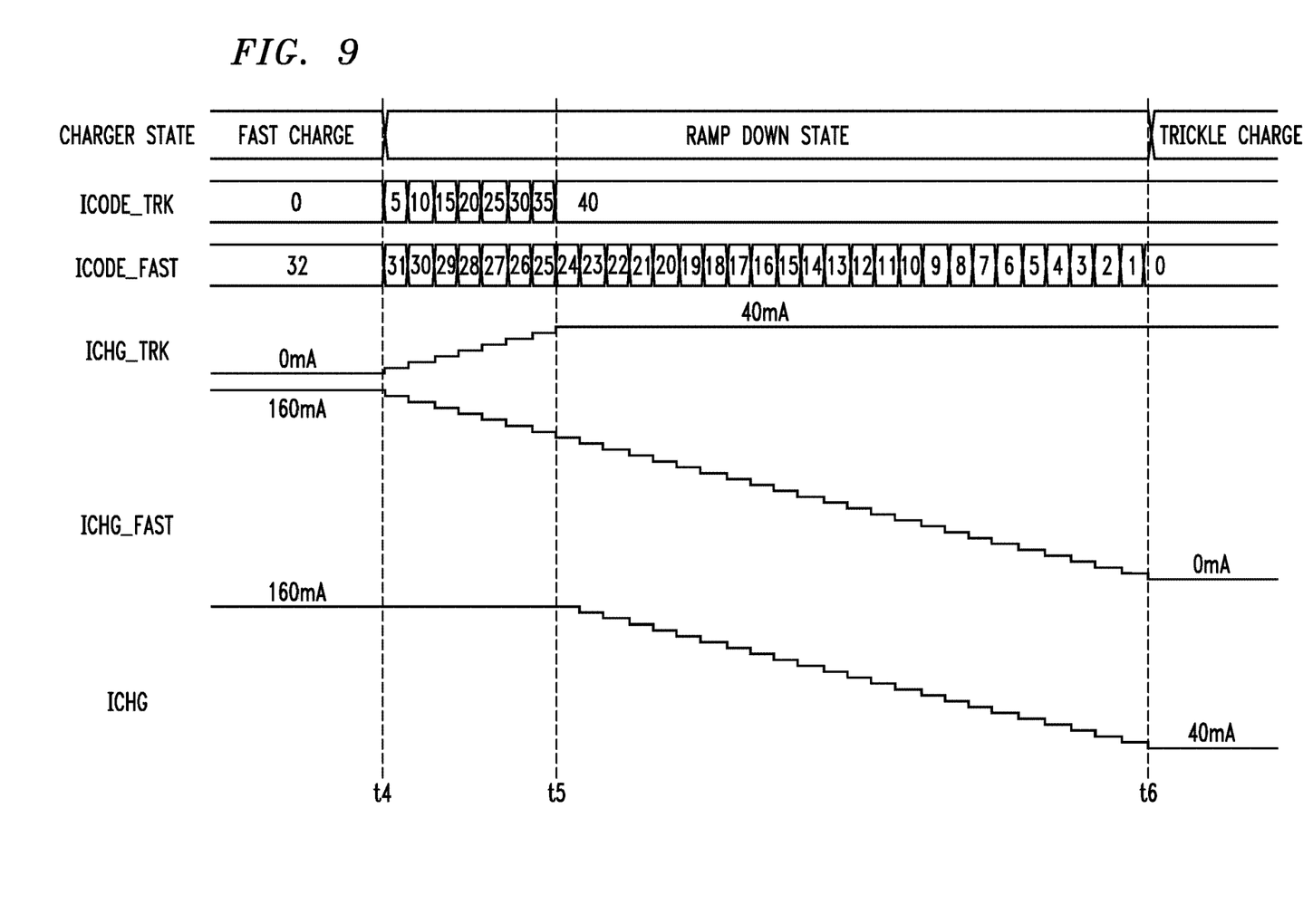
FIG. 9 is a timing diagram of example operations of the RX of FIG. 5 during a transition from the fast charging mode to the trickle charging mode.

FIG. 9 is a timing diagram of example operations of the RX 430 during a transition from (i) the fast charging mode in which only the fast power FET 438(2) contributes current to the charging current ICHG to (ii) the trickle charging mode in which only the trickle power FET 438(1) contributes current to the charging current ICHG.

As shown in FIG. 9, before time t4, the RX 430 is operated in the fast charging mode, where ICODE_TRK is 0, ICHG_TRK is 0 mA, ICODE_FAST is 32, ICHG_FAST is 160 mA, and the charging current ICHG is 160 mA.

From time t4 to time t6, the RX 430 transitions from the fast charging mode to the trickle charging mode in two different phases: a first, constant current phase from time t4 to time t5 and a second, current ramp-down phase from time t5 to time t6.

In particular, during the constant current phase from time t4 to time t5, ICODE_TRK is stepped up from 0 to 40 in increments of 5, while ICODE_FAST is stepped down from 32 to 24 in increments of 1, such that the charging current ICHG remains at 160 mA.

During the current ramp-down phase from time t5 to time t6, with ICODE_TRK at 40, ICODE_FAST is stepped down from 24 to 0 in increments of 1, resulting in the charging current ramping down from 160 mA to 40 mA.

After time t6, the RX 430 is operated in the trickle charging mode, where ICODE_TRK is 40, ICHG_TRK is 40 mA, ICODE_FAST is 0, ICHG_FAST is 0 mA, and the charging current ICHG is 40 mA.

Note that the digital control module 450 is configured to control the values of ICODE_TRK and ICODE_FAST during the sequences represented in FIGS. 8 and 9. Those skilled in the art will understand that the digital control module 450 can be configured to support a wide variety of different suitable sequences for controlling the operations of the RX 430. For example, in alternative sequences, the current ramp-up or ramp-down phase precedes the constant current phase when transitioning between the trickle and fast charging modes. Still other sequences may involve current ramp-up or ramp-down phases in which both codewords are varied without having any constant current phases.

Referring again to FIGS. 4 and 5, the comparator 448 compares the present battery voltage VBAT to the threshold voltage V_TRK. When VBAT is greater than V_TRK, the control signal 449 generated by the comparator 448 is high, and when VBAT is less than V_TRK, the control signal 449 is low. The control module 450 monitors the control signal 449 over time. If the RX 430 has been operating in the trickle charging mode and the control module 450 detects that the control signal goes from low to high, then the control module 450 initiates the sequence shown in FIG. 8 to transition to the fast charging mode. On the other hand, if the RX 430 has been operating in the fast charging mode and the control module 450 detects that the control signal 449 goes from high to low, then the control module 450 initiates the sequence shown in FIG. 9 to transition to the trickle charging mode.

Figure 10:
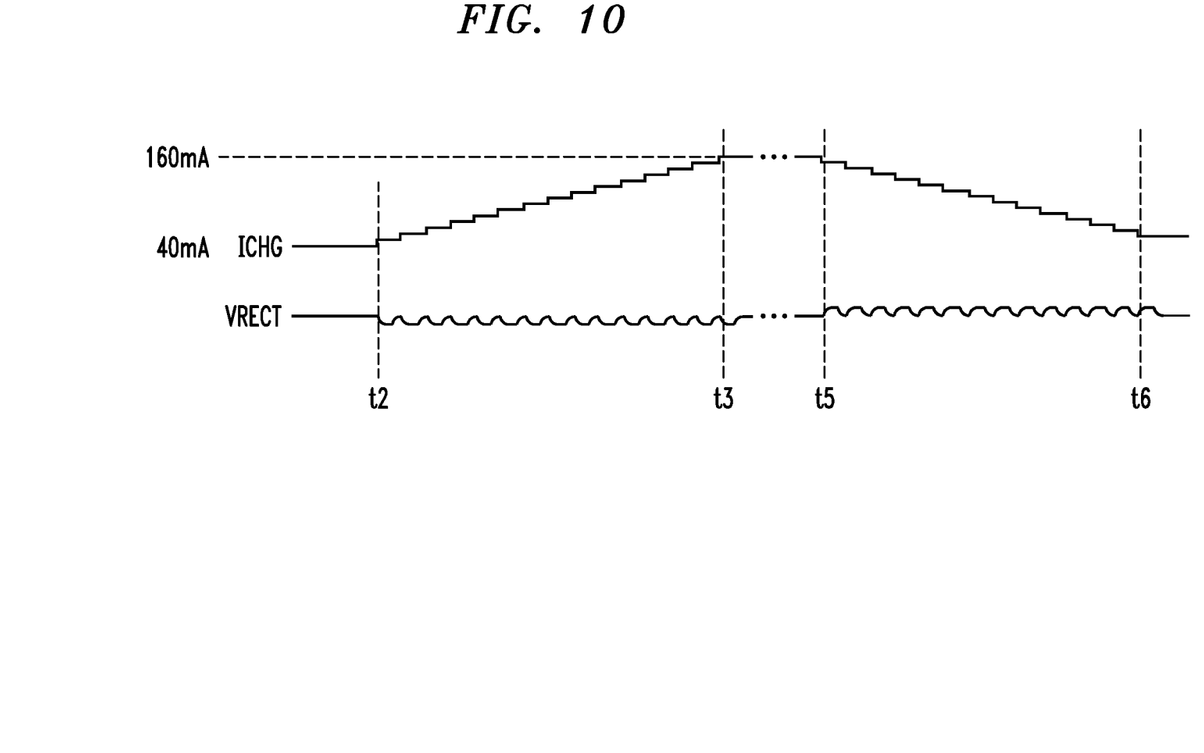
FIG. 10 is a timing diagram representing the ripple in the rectified voltage VRECT during the current ramp-up phase of FIG. 8 and during the current ramp-down phase of FIG. 9.

FIG. 10 is a timing diagram representing the ripple in the rectified voltage VRECT during the current ramp-up phase of FIG. 8 from time t2 to time t3 and during the current ramp-down phase of FIG. 9 from time t5 to time t6. As shown in FIG. 10, the magnitude of the ripple in VRECT is smaller than the magnitude of the ripple in VRECT in the conventional RX 130 as shown in FIG. 3. The sequences of FIGS. 8 and 9 provide smooth transitions between the trickle charging mode and the fast charging mode in order to keep the VRECT ripple at a low level, while still quickly implementing the transitions. Note that, for the sake of battery safety, quickly transitioning from the fast charging mode to the trickle charging mode will typically be more important than transitioning from the trickle charging mode to the fast charging mode.

The control module 450 is capable of controlling the charging current ICHG to have values from at least as low as ICHG_TRK to at least as high as ICHG_FAST, so the conventional system-level control loop of FIG. 1 is not needed to directly control the level of the battery charging current ICHG. Nevertheless, the RX 430 preferably still is configured to monitor either or both of VRECT and ICHG to signal the TX to increase or decrease the power transfer level as needed to make sure that an appropriate amount of power is being transferred from the TX to the RX 430. Since this system-level control is not needed to vary the power transfer level between the trickle and fast charging current levels, the probability of variations in the power transfer level interfering with the wireless communication path is greatly reduced.

Although the invention has been described in the context of the RX 430 having power FETs 438(1) and 438(2), the invention alternatively can be implemented with other suitable types of power devices for generating controlled currents, such as (without limitation) other suitable types of transistors.

Note that, although the invention has been described in the context of a wireless battery charging system in which the power transfer path and the communication path between the TX and RXs share the same inductive interface (e.g., analogous to the interface 120 in FIG. 1), the invention can also be implemented in the context of wireless battery charging systems having separate wireless interfaces for power transfer and communication.

The RX 430 may be a standalone subsystem for charging batteries or it may be part of a larger article of manufacture that might or might not include the TX of the wireless battery charging system. For example, the RX 430 may be part of a battery-powered consumer device, such as (without limitation) a cell phone, where the TX is external to that consumer device. In that case, the article of manufacture is the consumer device, which does not include the TX that is used to transfer power to the RX to charge the consumer device's battery.

Although the invention has been described in the context of wireless battery charging system, the invention can also be implemented in the context of wired battery charging systems.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may comprise multiple transistors coupled in parallel to get desired electrical characteristics from the combination. Further, the illustrated transistors may be composite transistors.

As used in this specification and claims, the term "channel node" refers generically to either the source or drain of a metal oxide semiconductor (MOS) transistor device (also referred to as a MOSFET), the term "channel" refers to the path through the device between the source and the drain, and the term "control node" refers generically to the gate of the MOSFET. Similarly, as used in the claims, the terms "source," "drain," and "gate" or "source terminal", "drain terminal" and "gate terminal" should be understood to refer respectively either to the source, drain, and gate of a MOSFET or to the emitter, collector, and base of a bi-polar device if an embodiment of the invention is implemented using bi-polar transistor technology.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A receiving device that is wirelessly chargeable, comprising:
   a trickle charging device that generates at least two trickle charging currents for charging a battery;
   a trickle charging regulator that controls the trickle charging device;
   a fast charging device that generates at least two fast charging currents for charging the battery,
   wherein at least one of the fast charging currents is greater than at least one of the trickle charging currents;
   a fast charging regulator that controls the fast charging device; and
   a digital control module that generates a trickle charging codeword for controlling the trickle charging regulator and a fast charging codeword for controlling the fast charging regulator,
   wherein the trickle charging codeword corresponds to a specific current within the trickle charging currents and the fast charging codeword corresponds to a specific current within the fast charging currents;
   wherein the trickle charging device and the fast charging device are in parallel;
   a current summer coupled to the trickle charging device, the fast charging device and the battery;
   wherein the current summer is configured to combine the trickle charging currents and the fast charging currents into a battery charging current provided to the battery;
   wherein the receiving device is configured to have a constant current phase and a ramp-up phase;
   wherein in the constant current phase at least one of the trickle charging currents is decreased by a first increment and at least one of the fast charging currents is increased by a second increment such that the battery charging current remains substantially at a constant current;
   wherein in the ramp-up phase the at least one of the fast charging currents is further increased by the second increment such that the battery charging current exceeds the constant current; and
   wherein the first increment is different from the second increment.

2. The receiving device of claim 1,
   wherein the digital control module generates values for the trickle and fast charging codewords for:
      a trickle charging mode in which only the trickle charging device generates the battery charging current;
      a fast charging mode in which only the fast charging device generates the battery charging current; and
      transition modes in which both the trickle charging device and the fast charging device generate the battery charging current.

3. The receiving device of claim 2,
wherein each transition mode comprises:
   a constant current phase in which both the trickle charging codeword and the fast charging codeword are modified so that the battery charging current is constant; and
   a current ramp phase in which only one of the trickle charging codeword and the fast charging codeword is modified so that the battery charging current ramps up or ramps down.

4. The receiving device of claim 1,
wherein each of the fast and trickle charging regulators comprises:
   a programmable current mirror that generates a mirrored current sink signal based on (i) a tapped current signal tapped from an output of the corresponding fast and trickle charging devices, and (ii) the corresponding charging codeword;
   a second current summer that generates a net current signal based on at least the mirrored current sink signal and a constant current source signal; and
   a current-to-voltage (I2V) converter that converts the net current signal into a gate control signal for the corresponding fast and trickle charging devices.

5. The receiving device of claim 4,
further comprising an amplifier that generates an amplifier output signal based on a difference between a present battery voltage level and a battery regulator voltage threshold,
wherein:
   each of the trickle charging regulator and the fast charging regulator further comprises a voltage-to-current (V2I) converter that converts the amplifier output signal into an amplifier current sink signal; and
   the second current summer generates the net current signal based on the mirrored current sink signal, the amplifier current sink signal, and the constant current source signal.

6. The receiving device of claim 1,
wherein, when transitioning from a trickle charging mode to a fast charging mode, the digital control module configures the receiving device into the constant current phase followed by the current ramp-up phase,
wherein:
   during the constant current phase, the digital control module instructs (i) the trickle charging regulator to control the trickle charging device to decrease the at least one of the trickle charging currents and (ii) the fast charging regulator to control the fast charging device to increase the at least one of the fast charging currents; and
   during the current ramp-up phase, the digital control module instructs the fast charging regulator to increase the at least one of the fast charging currents such that the battery charging current increases.

7. The receiving device of claim 6,
wherein the constant current phase is a first constant current phase;
wherein, when transitioning from the fast charging mode to the trickle charging mode, the digital control module configures the receiving device into a second constant current phase followed by a current ramp-down phase,
wherein:
during the second constant current phase, the digital control module instructs (i) the trickle charging regulator to control the trickle charging device to increase the at least one of the trickle charging currents and (ii) the fast charging regulator to control the fast charging device to decrease the at least one of the fast charging currents such that the battery charging current remains substantially constant; and
   during the current ramp-down phase, the digital control module instructs the fast charging regulator to decrease the at least one of the fast charging currents such that the battery charging current decreases.

8. The receiving device of claim 1,
wherein the trickle charging device and the fast charging device are FETs.

9. The receiving device of claim 1,
wherein the receiving device is coupled to a power transmitter of a battery charging system, for receiving power from the power transmitter via an inductive interface.

10. The receiving device of claim 9,
wherein the receiving device communicates wirelessly with the power transmitter via the inductive interface.

11. The receiving device of claim 1:
wherein the at least two trickle charging currents and the at least two fast charging currents are not zero currents.

12. The receiving device of claim 1:
wherein a differential between the at least two trickle charging currents is different from a differential between the at least two fast charging currents.

13. The receiving device of claim 1:
wherein the receiving device is configured to have a current ramp-down phase;
wherein the constant current is a first constant current;
wherein in the current ramp-down phase the at least one of the trickle charging currents is increased by the first increment and the at least one of the fast charging currents is decreased by the second increment such that the battery charging current remains substantially at a second constant current;
wherein in the ramp-down phase the at least one of the fast charging currents is further decreased by the second increment such that the battery charging current falls below the second constant current.

14. A receiving device that is wirelessly chargeable, comprising:
   a trickle charging device that generates at least two trickle charging currents for charging a battery of the receiving device;
   a trickle charging regulator that controls the trickle charging device;
   a fast charging device that generates at least two fast charging currents for charging the battery, wherein at least one of the fast charging currents is greater than at least one of the trickle charging currents;
   a fast charging regulator that controls the fast charging device;
   wherein the trickle charging device and the fast charging device are in parallel;
   a first current summer that receives the trickle charging currents and the fast charging currents and generates a battery charging current that is used to charge the battery; and
   a digital control module that generates a trickle charging codeword for controlling the trickle charging regulator and a fast charging codeword for controlling the fast charging regulator,
   wherein the trickle charging codeword corresponds to a specific current within the trickle charging currents and the fast charging codeword corresponds to a specific current within the fast charging currents
wherein the receiving device is configured to have a constant current phase and a ramp-up phase;
wherein in the constant current phase at least one of the trickle charging currents is decreased by a first increment and at least one of the fast charging currents is increased by a second increment such that the battery charging current remains substantially at a constant current;
wherein in the ramp-up phase the at least one of the fast charging currents is further increased by the second increment such that the battery charging current exceeds the constant current; and
wherein the first increment is different from the second increment.

15. The receiving device of claim 14,
wherein the trickle charging device and the fast charging device are FETs.

16. The receiving device of claim 14, wherein the digital control module generates values for the trickle and fast charging codewords for:
a trickle charging mode in which only the trickle charging device generates the battery charging current;
a fast charging mode in which only the fast charging device generates the battery charging current;
transition modes in which both the trickle charging device and the fast charging device generate the battery charging current.

17. The receiving device of claim 16,
wherein each transition mode comprises:
the constant current phase in which both the trickle charging codeword and the fast charging codeword are modified so that the battery charging current is constant; and
a current ramp phase in which only one of the trickle charging codeword and the fast charging codeword is modified such that the battery charging current ramps up or ramps down.

18. The receiving device of claim 14,
wherein each of the first and trickle charging regulators comprises:
a programmable current mirror that generates a mirrored current sink signal based on (i) a tapped current signal tapped from an output of the corresponding trickle charging device and fast charging device and (ii) the corresponding charging codeword;
a second current summer that generates a net current signal based on at least the mirrored current sink signal and a constant current source signal; and
a current-to-voltage (I2V) converter that converts the net current signal into a gate control signal for the corresponding power device.

19. The receiving device of claim 18,
further comprising an amplifier that generates an amplifier output signal based on a difference between a present battery voltage level and a battery regulator voltage threshold,
wherein:
each of the trickle charging regulator and the fast charging regulator further comprises a voltage-to-current (V2I) converter that converts the amplifier output signal into an amplifier current sink signal; and
the second current summer generates the net current signal based on the mirrored current sink signal, the amplifier current sink signal, and the constant current source signal.

20. The receiving device of claim 19,
wherein, when transitioning from a trickle charging mode to a fast charging mode, the digital control module configures the receiving device into the constant current phase followed by the current ramp-up phase,
wherein:
during the constant current phase, the digital control module instructs (i) the trickle charging regulator to control the trickle charging device to decrease the at least one of the trickle charging currents and (ii) the fast charging regulator to control the fast charging device to increase at the least one of the fast charging currents such that the battery charging current remains substantially constant; and
during the current ramp-up phase, the digital control module instructs the fast charging regulator to increase the at least one of the fast charging currents such that the battery charging current increases.

21. The receiving device of claim 19,
wherein, when transitioning from a fast charging mode to a trickle charging mode, the digital control module configures the receiving device into the constant current phase followed by a current ramp-down phase,
wherein:
during the constant current phase, the digital control module instructs (i) the trickle charging regulator to control the trickle charging device to increase the at least one of the trickle charging currents and (ii) the fast charging regulator to control the fast charging device to decrease the at least one of the fast charging currents such that the battery charging current remains substantially constant; and
during the current ramp-down phase, the digital control module instructs the fast charging regulator to decrease the at least one of the fast charging currents such that the battery charging current decreases.

* * * * *